(12) United States Patent
Mason et al.

(10) Patent No.: US 9,181,499 B2
(45) Date of Patent: Nov. 10, 2015

(54) SYSTEMS AND METHODS FOR MONITORING AND CONTROLLING DESALTING IN A CRUDE DISTILLATION UNIT

(71) Applicant: Ecolab USA Inc., Naperville, IL (US)

(72) Inventors: Brad Mason, Katy, TX (US); Sam Lordo, Fulshear, TX (US); Michael Braden, Sugar Land, TX (US); Jeffrey Hubbard, Houston, TX (US)

(73) Assignee: Ecolab USA Inc., Naperville, IL (US)

( * ) Notice: Subject to any disclaimer, the term of this patent is extended or adjusted under 35 U.S.C. 154(b) by 169 days.

(21) Appl. No.: 13/745,445

(22) Filed: Jan. 18, 2013

(65) Prior Publication Data
US 2014/0202929 A1 Jul. 24, 2014

(51) Int. Cl.
*B01D 17/04* (2006.01)
*B01D 21/30* (2006.01)
(Continued)

(52) U.S. Cl.
CPC .............. *C10G 31/08* (2013.01); *B01D 17/047* (2013.01); *B01D 17/048* (2013.01);
(Continued)

(58) Field of Classification Search
CPC .... B01D 17/02; B01D 17/0208; B01D 17/04; B01D 17/044; B01D 17/045; B01D 17/047; B01D 17/048; B01D 17/12; B01D 21/01; B01D 21/30; B01D 21/305; B01D 21/32; B01D 21/34; B01D 21/0009; C02F 1/30; C02F 1/46; C02F 1/465; C02F 2103/365; C02F 2209/29; C02F 2209/40; C02F 2209/42; C02F 1/461; C02F 1/48; C02F 1/487; G01N 33/28; G01N 33/2823; G01N 33/1833; C01G 7/00; C01G 7/04; C01G 7/12; C01G 32/00; C01G 32/02; C01G 33/02; C01G 33/04; C01G 33/08; G05D 7/06; G05D 7/0623; C10G 32/00; C10G 32/02; C10G 33/02; C10G 33/04; C10G 33/08
USPC ........ 196/46; 208/178, 187, 188, 251, 251 R, 208/298; 210/85, 86, 96.1, 101, 103–105, 210/207, 209, 243, 511, 513, 519, 634, 639, 210/702, 708, 748.01, 7, 72, 799, 800; 203/1, 3, 39, 47
See application file for complete search history.

(56) References Cited

U.S. PATENT DOCUMENTS
2,446,040 A * 7/1948 Blair, Jr. ....................... 516/143
3,620,959 A 11/1971 Forrest, Sr.
(Continued)

FOREIGN PATENT DOCUMENTS
EP 0735126 A2 10/1996
EP 0735126 A3 2/1997
(Continued)

OTHER PUBLICATIONS
Publication: "Electrostatic enhancement of coalescence of water droplets in oil: a review of the technology", John S. Eow et al, Chemical Engineering Journal, vol. 85, 2002, pp. 357-368.*
(Continued)

*Primary Examiner* — Joseph Drodge
(74) *Attorney, Agent, or Firm* — Senniger Powers LLP

(57) ABSTRACT

Disclosed herein are systems and methods for automated real-time monitoring and controlling desalting in a crude distillation unit. Crude oil and wash water are mixed by a pressure drop across a mix valve, thereby forming a crude oil/water phase stream. The crude oil/water phase stream is supplied into a desalter vessel, whereupon an emulsion forms at an interface between the crude oil and the water phase. The crude oil/water phase stream is contacted with a dosage of an emulsion breaker in an applied electric field. At least one property associated with the emulsion is measured using an emulsion level indicator. A total chlorine and a water percentage of the crude oil are measured. At least one of the pressure drop and the dosage of the emulsion breaker is adjusted substantially in real time in response to at least one of the measured properties, total chlorine, and water percentage.

24 Claims, 2 Drawing Sheets

(51) Int. Cl.

| | | |
|---|---|---|
| *B01D 21/32* | (2006.01) | |
| *B01D 21/34* | (2006.01) | |
| *C02F 1/48* | (2006.01) | |
| *C02F 1/30* | (2006.01) | |
| *C10G 31/08* | (2006.01) | |
| *C02F 1/465* | (2006.01) | |
| *C10G 32/00* | (2006.01) | |
| *C10G 33/02* | (2006.01) | |

(52) U.S. Cl.
CPC ............ *B01D 21/305* (2013.01); *B01D 21/32* (2013.01); *B01D 21/34* (2013.01); *C02F 1/465* (2013.01); *C10G 32/00* (2013.01); *C10G 33/02* (2013.01); *C02F 2209/29* (2013.01); *C02F 2209/40* (2013.01)

(56) References Cited

U.S. PATENT DOCUMENTS

| | | | |
|---|---|---|---|
| 4,252,631 A | 2/1981 | Hovarongkura et al. | |
| 4,325,813 A | 4/1982 | Brown et al. | |
| 4,581,134 A | 4/1986 | Richter, Jr. et al. | |
| 4,806,231 A | 2/1989 | Chirinos et al. | |
| 4,947,885 A | 8/1990 | Hart | |
| 5,066,199 A | 11/1991 | Reese et al. | |
| 5,195,879 A | 3/1993 | Reese et al. | |
| 5,256,305 A * | 10/1993 | Hart | 210/708 |
| 5,271,841 A * | 12/1993 | Hart | 210/634 |
| 5,283,001 A | 2/1994 | Gregoli et al. | |
| 5,360,458 A | 11/1994 | Forsberg et al. | |
| 5,656,151 A * | 8/1997 | McLaughlin et al. | 208/95 |
| 5,746,908 A | 5/1998 | Mitchell | |
| 5,882,506 A | 3/1999 | Ohsol et al. | |
| 5,976,366 A | 11/1999 | Hwang et al. | |
| 6,086,750 A | 7/2000 | Eaton | |
| 6,103,100 A | 8/2000 | Hart | |
| 6,113,765 A | 9/2000 | Wagner | |
| 6,159,374 A | 12/2000 | Hart | |
| 6,383,368 B1 | 5/2002 | Eaton | |
| 7,612,117 B2 | 11/2009 | McDaniel et al. | |
| 7,771,588 B2 | 8/2010 | Engel et al. | |
| 8,168,062 B2 | 5/2012 | McDaniel et al. | |
| 2006/0160227 A1 | 7/2006 | Sethumadhavan et al. | |
| 2007/0111903 A1 | 5/2007 | Engel et al. | |
| 2007/0112079 A1 | 5/2007 | McDaniel et al. | |
| 2007/0125685 A1 | 6/2007 | Goliaszewski et al. | |
| 2009/0099808 A1 | 4/2009 | Winfield et al. | |
| 2010/0015720 A1 * | 1/2010 | McDaniel et al. | 436/164 |
| 2011/0226666 A1 | 9/2011 | Koseoglu et al. | |
| 2011/0253598 A1 | 10/2011 | McDaniel et al. | |
| 2012/0024758 A1 | 2/2012 | Love | |
| 2013/0024026 A1 * | 1/2013 | Prasad et al. | 700/272 |
| 2013/0026082 A1 * | 1/2013 | Al-Shafei et al. | 210/96.1 |
| 2013/0082005 A1 * | 4/2013 | Sams et al. | 210/704 |
| 2014/0198898 A1 * | 7/2014 | Beumer et al. | 378/47 |

FOREIGN PATENT DOCUMENTS

| | | |
|---|---|---|
| EP | 0735126 B1 | 8/1999 |
| EP | 2377910 A1 | 10/2011 |
| WO | 9729169 A1 | 8/1997 |
| WO | 9925795 A1 | 5/1999 |
| WO | 0001785 A1 | 1/2000 |
| WO | 2007061722 A2 | 5/2007 |
| WO | 2007061722 A3 | 5/2007 |
| WO | 2011116059 A1 | 9/2011 |
| WO | 2012015666 A2 | 2/2012 |

OTHER PUBLICATIONS

International Search Report and Written Opinion issued for PCT/US2014/077850, dated Apr. 15, 2014, 9 pages.

\* cited by examiner

SYSTEMS AND METHODS FOR MONITORING AND CONTROLLING DESALTING IN A CRUDE DISTILLATION UNIT

TECHNICAL FIELD

This invention relates generally to systems and methods for monitoring and controlling desalting in a crude distillation unit. More specifically, the invention relates to desalting automation systems and methods for measuring at least one property associated with the emulsion at an interface between the crude oil and the water phase, using an emulsion level indicator. The invention has particular relevance to waste water operations, corrosion and fouling of crude unit equipment, and other downstream applications.

BACKGROUND

In a crude oil refinery, generally the oil is pumped from a storage tank to a crude unit for processing. The crude unit cleans the oil through water washing in a desalter and then splits the oil into fractions in an atmospheric distillation tower. These fractions are pumped to various processing units downstream of the crude unit (e.g., vacuum distillation, delayed coker, catalytic cracker, hydroprocessing units etc.). Corrosion and corrosion byproduct deposition (the latter sometimes referred to herein as fouling) occur in many areas of a crude unit.

Refinery crude unit processing has become increasingly difficult in recent years and is predicted to become even more challenging and complex for several reasons. For example, significant increases in crude oil prices have caused refiners to aggressively pursue "opportunity" or "challenging" crudes that are obtainable at discounted prices. The lower price is linked to a crude property such as high acid or high solids content that makes it less desirable than the light, sweet benchmark crudes.

Refiners switch crude slates more frequently (every 2-3 days) than in the past due to minimum on-hand crude oil inventory combined with increased crude oil variety. A crude slate switch typically upsets the steady state condition of a crude unit for up to several hours. Generally, about eighty percent of the corrosion and fouling occurs during these switches or disruptions, which normally last about twenty percent of the time. If fouling and corrosion issues are severe enough, the refiner will discontinue processing the crude oil or blend of crudes causing the problem. However, these challenging crudes are available to the refiner at a discount thus making them more profitable. Discontinuing such problematic crudes is accordingly not a very popular option.

In efforts to reduce corrosion, a crude unit may be serviced two or three times per week, or in some cases daily. Daily service at best provides a snap shot view of a dynamic crude unit system. Crude type and/or raw crude storage tanks are switched several times per week, sometimes daily. The contents of each tank are different from the others, so each switch causes a change of feed quality to the crude unit, many times upsetting the steady state status and causing disruptions in the system. Preheating, desalting, and distilling operations shift with the new crude, sending products and/or effluent water sources off specification. Many adjustments over several hours (in some cases days) normally take place to return the crude unit to steady state operation.

The most common current industry practice to control such disruptions and optimize crude unit operation is to provide enough manpower and man-hours. For instance, each crude unit may have an operating crew from three to ten people, depending on size and complexity of the unit. This crew may spend their day gathering various samples for wet chemistry lab testing, and measuring and making adjustments for temperature and flow to keep the unit running within specification. Such practice is typically geared toward keeping the unit operating properly regarding fractionation quality cut points and end points, with minimal attention being paid to a specialty chemical control program. If a disruption is severe, changes may be made to the process chemicals and/or changes in levels, flows, or temperatures may be recommended around the crude unit to keep the dynamic system in as optimum a condition as possible. There thus exists an ongoing need for systems and methods for automated real-time monitoring and controlling of desalting in a crude oil unit.

SUMMARY

This invention accordingly provides system and methods for automated real-time monitoring and controlling desalting in a crude distillation unit. In an aspect, the invention provides a system including a mix valve, desalter vessel, an emulsion level indicator, a chlorine analyzer, a water analyzer, and a controller operatively coupled to the mix valve, emulsion level indicator, chlorine analyzer, and water analyzer. The mix valve mixes crude oil and wash water by a pressure drop across the mix valve, and thereby forms a crude oil/water phase stream. The desalter vessel receives the crude oil/water phase stream, whereupon an emulsion forms at an interface between the crude oil and the water phase. The desalter vessel is configured to contact the crude oil/water phase stream with a dosage of an emulsion breaker in an applied electric field. The emulsion level indicator is coupled to an outer surface of the desalter vessel, and is capable of measuring at least one property associated with the emulsion. The chlorine analyzer is capable of measuring a total chlorine of the crude oil. The water analyzer is capable of measuring a water percentage of the crude oil. The controller adjusts substantially in real time at least one of the pressure drop and the dosage of the emulsion breaker in response to at least one of the measured properties, total chlorine, and water percentage.

In another aspect, the invention provides a method of monitoring and controlling desalting in a crude distillation unit. The method includes mixing crude oil and wash water by a pressure drop across a mix valve, thereby forming a crude oil/water phase stream. The crude oil/water phase stream is supplied into a desalter vessel, whereupon an emulsion forms at an interface between the crude oil and the water phase. The crude oil/water phase stream is contacted with a dosage of an emulsion breaker in an applied electric field. At least one property associated with the emulsion is measured using an emulsion level indicator. A total chlorine and a water percentage of the crude oil are measured. At least one of the pressure drop and the dosage of the emulsion breaker is adjusted substantially in real time in response to at least one of the measured properties, total chlorine, and water percentage.

It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION

Figure 1:
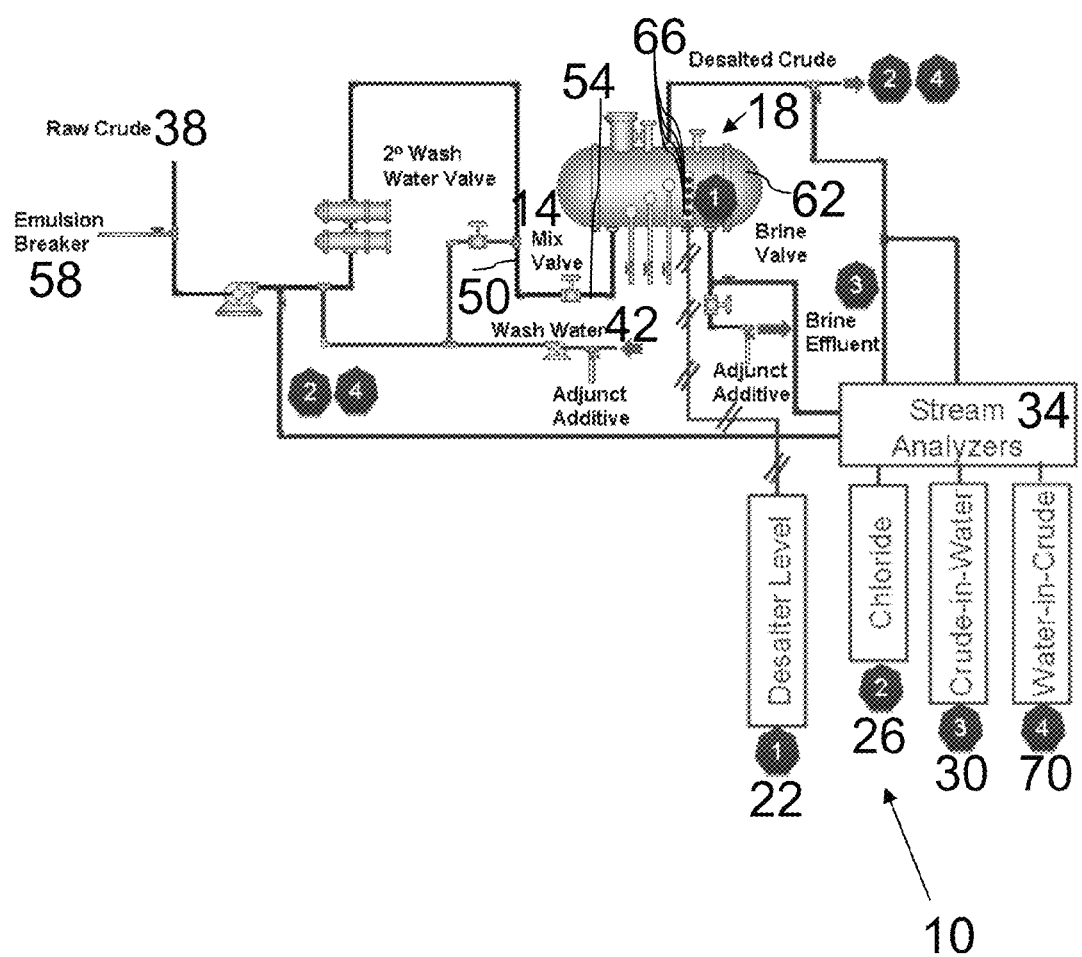
FIG. 1 is a schematic illustration of a system for monitoring and controlling desalting in a crude distillation unit according to one embodiment of the invention, including a mix valve, a desalter vessel, an emulsion level indicator, a chlorine analyzer, a water analyzer, and a controller.

Described herein are systems and methods for automated real-time monitoring and controlling desalting in a crude distillation unit. The systems and methods can be advantageous in reducing unit variability that may lead to desalting upsets that in turn can impact waste water operations, corrosion and fouling of crude unit equipment, and other downstream applications. The system includes a mix valve, a desalter vessel, an emulsion level indicator coupled to an outer surface of the desalter vessel, a chlorine analyzer, a water analyzer, and a controller operatively coupled to the mix valve, emulsion level indicator, and/or chlorine analyzer, and/or water analyzer. In some embodiments, the emulsion level indicator, chlorine analyzer, and water analyzer may be retrofitted to an incumbent mix valve and desalter vessel.

Conventional desalter analyzers or emulsion level indicators utilize probes that are inserted into the desalter vessel through suitable ports. Accordingly, if the ports do not exist in the desalter vessel, the conventional desalter analyzer may not be used. Probes inserted into the desalter vessel may be prone to fouling and erroneous readings due to wax and/or iron sulfide present. Furthermore, probes inserted into the desalter vessel can be damaged through the insertion, retraction, calibration process, and during an inspection or cleaning operation in a shutdown. In contrast, the emulsion level indicator disclosed herein is coupled to an outer surface of the desalter vessel. As such, the desalter system disclosed herein may not require any probes to be inserted into the desalter vessel for measuring at least one property associated with the emulsion. Furthermore, the emulsion level indicator may be installed without the need to shut down the desalter system.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, for the recitation of numeric ranges herein, each intervening number therebetween with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "controller" refers to a manual operator or an electronic device having components such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components. The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feedforward, or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components such as a signal conditioner or system monitor may be included to facilitate signal transmission and signal-processing algorithms.

2. SYSTEM FOR MONITORING AND CONTROLLING DESALTING IN A CRUDE OIL UNIT

The present invention is directed to a system for automated real-time monitoring and controlling desalting in a crude oil unit. Referring to FIG. 1, the system 10 includes a mix valve 14, a desalter vessel 18, an emulsion level indicator 22, a chlorine analyzer 26, a water analyzer 30, and a controller 34 operatively coupled to the mix valve 14, emulsion level indicator 22, and/or chlorine analyzer 26, and/or water analyzer 30. The mix valve 14 mixes crude oil 38 and wash water 42 by a pressure drop across the mix valve 14, and thereby forms a crude oil/water phase stream 46. In the illustrated embodiment, the mix valve 14 includes an inlet 50 for receiving the crude oil 38 and wash water 42, and an outlet 54 for discharging the crude oil/water phase stream 46. The pressure drop in the illustrated embodiment is determined between the inlet 50 and outlet 54. The desalter vessel 18 receives the crude oil/water phase stream 46, whereupon an emulsion (not shown) forms at an interface between the crude oil and the water phase. The desalter vessel 18 is configured to contact the crude oil/water phase stream 46 with a dosage of an emulsion breaker 58 in an applied field. In some embodiments, the emulsion level indicator 22, chlorine analyzer 26, and water analyzer 30 may be retrofitted to an incumbent mix valve 14 and desalter vessel 18. As explained below, the pressure drop across the mix valve 14 and the dosage of the emulsion breaker 58 are adjusted substantially in real time by the controller 34 for automated real-time monitoring and controlling desalting.

The emulsion level indicator 22 is coupled to an outer surface 62 of the desalter vessel 18. As such, the emulsion level indicator 22 may be installed without the need to shut down the system 10. In some embodiments, the emulsion level indicator 22 is positioned adjacent to the interface between the crude oil and the water phase. In further embodiments, the emulsion level indicator 22 is positioned at a first range of elevations, the interface between the crude oil and the water phase is positioned at a second range of elevations, and the first and second ranges overlap. In some embodiments, the emulsion level indicator 22 is attached to existing try-lines (also called "taps" or "trycocks") on the outside of the desalter vessel 18. Typically, five or six try-lines are built in to a desalter vessel to visually see where the emulsion is, how wide it may be, and what it might be composed of Clamping the emulsion level indicator 22 to the try-lines affords an easier installation compared to other commercial alternatives. Moreover, the installation work can be done under a "cold-work permit" because the emulsion level indicator 22 does not need to be directly welded to the desalter vessel 18.

The emulsion level indicator 22 is capable of measuring at least one property associated with the emulsion, e.g., a width of the interface and a rate of change. In some embodiments, the emulsion level indicator 22 is capable of measuring a water percentage at, below, and above the crude/oil interface, and then convert this to an actual level (e.g., inches or cm/mm depending on country), all external to the desalter vessel 18. In some embodiments, the emulsion level indicator 22 works by measuring the hydrogen content in the hydrocarbon, emulsion, and water phases inside the desalter vessel 18, with detectors and equipment 66 physically located outside the vessel. The detectors 66 may measure the hydrogen content based on neutron backscatter principles. For example, the detectors 66 may use a low level radiation source such as one derived from americium 241 ($^{241}$Am). An oxide of americium may be pressed with beryllium to make an efficient neutron source for the detectors 66. Although FIG. 1 illustrates the emulsion level indicator 2 as including four detectors 66 coupled to the outer surface 62 of the desalter vessel 18, it is to be appreciated that other embodiments may utilize other numbers of detectors 66. For example, the emulsion level indicator 22 may include one or more, two or more, three or more, four or more, five or more, six or more, seven or more, eight or more, nine or more, or ten or more detectors 66. Each detector 66 may be located at a corresponding level of existing try-lines. As such, checking the accuracy of the output of the detectors 66 may be a simple and regular process. Each detector 66 may be connected by cabling to a multichannel reader that can route the output through a communication hardware to the data control system (not shown) as explained below. As explained below, the properties of the emulsion measured by the emulsion level indicator 22 are used by the controller 34 for automated real-time monitoring and controlling desalting.

The chlorine analyzer or salt-in-crude monitor 26 is capable of measuring or determining a total chlorine of the crude oil. In some embodiments, the chlorine analyzer 26 may measure the total chlorine of the crude oil based upon bombarding or irradiating the crude oil with neutrons. The neutrons are slowed down and thereafter engage in thermal neutron capture reactions with the elements chlorine and sulfur in the crude oil. Gamma ray energy radiation of the crude oil is emitted in response to the capture of thermal neutrons. A measure of the concentration of chlorine and/or sulfur may be obtained based upon the detection of gamma radiation. Though any suitable gamma ray detector may be used, exemplary gamma ray detectors include those disclosed in U.S. Patent App. Publ'n No. 2009/0099808 titled "Method for Monitoring Fouling in a Cooling Tower," hereby incorporated by reference in its entirety. A typical gamma ray detector is a 2-inch sodium iodide scintillation detector, such as the ones manufactured by Ludlum. Although not shown in FIG. 1, a radiation counting device receives the signal from the detector. A Model 2200 Scalar Ratemeter by Ludlum is a typical type of counting device. The detector and counting device measure the intensity of the transmitted gamma radiation. For example, a typical counting device may display the measurement of the radiation intensity as counts of radiation per specified time period (e.g. 5,000 counts/6 seconds).

In some embodiments, the chlorine analyzer 26 is capable of measuring a total chlorine of about 3,000 ppm or less. In further embodiments, the chlorine analyzer 26 is capable of measuring a total chlorine of about 3,000 ppm or less, 2,000 ppm or less, 1,000 ppm or less, 900 ppm or less, 800 ppm or less, 700 ppm or less, 600 ppm or less, 500 ppm or less, 400 ppm or less, 300 ppm or less, 200 ppm or less, 100 ppm or less, 90 ppm or less, 80 ppm or less, 70 ppm or less, 60 ppm or less, 50 ppm or less, 40 ppm or less, 30 ppm or less, 20 ppm or less, 10 ppm or less, 9 ppm or less, 8 ppm or less, 7 ppm or less, 6 ppm or less, 5 ppm or less, 4 ppm or less, 3 ppm or less, 2.9 ppm or less, about 2.8 ppm or less, about 2.7 ppm or less, about 2.6 ppm or less, about 2.5 ppm or less, about 2.4 ppm or less, about 2.3 ppm or less, about 2.2 ppm or less, about 2.1 ppm or less, about 2.0 ppm or less, about 1.9 ppm or less, about 1.8 ppm or less, about 1.7 ppm or less, about 1.6 ppm or less, about 1.5 ppm or less, about 1.4 ppm or less, about 1.3 ppm or less, about 1.2 ppm or less, about 1.1 ppm or less, or about 1.0 ppm or less. As explained below, the total chlorine of the crude oil measured by the chlorine analyzer 26 is used by the controller 34 for automated real-time monitoring and controlling desalting.

The water analyzer 30 is capable of measuring a water percentage of the crude oil. In some embodiments, the water analyzer 30 is capable of measuring the water percentage of about 1.00% or less. In some embodiments, the water analyzer 30 is capable of measuring a water percentage of about 0.01% or more, 0.02% or more, 0.03% or more, 0.04% or more, 0.05% or more, about 0.10% or more, about 0.15% or more, about 0.20% or more, about 0.25% or more, about 0.30% or more, about 0.35% or more, about 0.40% or more, about 0.45% or more, about 0.50% or more, about 0.55% or more, about 0.60% or more, about 0.65% or more, about 0.70% or more, about 0.75% or more, about 0.80% or more, about 0.85% or more, about 0.90% or more, or about 0.95% or more. In further embodiments, the water analyzer 30 is capable of measuring a water percentage of about 1.00% or less, about 0.95% or less, about 0.90% or less, about 0.85% or less, about 0.80% or less, about 0.75% or less, about 0.70% or less, about 0.65% or less, about 0.60% or less, about 0.55% or less, about 0.50% or less, about 0.45% or less, about 0.40% or less, about 0.35% or less, about 0.30% or less, about 0.25% or less, about 0.20% or less, about 0.15% or less, or about 0.10% or less. This includes water percentages of about 0.01% to about 1.00%, 0.05% to about 1.00%, or about 0.05% to about 0.50%. As explained below, the water percentage of the crude oil measured by the water analyzer 30 is used by the controller 34 for automated real-time monitoring and controlling desalting.

The controller 34 adjusts substantially in real time at least one of the pressure drop across the mix valve 14 (e.g., how much the mix valve 14 open and closes) and the dosage of the emulsion breaker 58 in response to at least one of the measured properties, total chlorine, and water percentage. In some embodiments, the controller 34 controls the total chlorine in the crude oil to be less than about 3.0 ppm, less than about 2.9 ppm, less than about 2.8 ppm, less than about 2.7 ppm, less than about 2.6 ppm, less than about 2.5 ppm, less than about 2.4 ppm, less than about 2.3 ppm, less than about 2.2 ppm, less than about 2.1 ppm, less than about 2.0 ppm, less than about 1.9 ppm, less than about 1.8 ppm, less than about 1.7 ppm, less than about 1.6 ppm, less than about 1.5 ppm, less than about 1.4 ppm, less than about 1.3 ppm, less than about 1.2 ppm, less than about 1.1 ppm, or less than about 1.0 ppm. Limiting the total chlorine to less than about 3 ppm in the crude oil may protect downstream processes from excess corrosion, and also reduce the amount of sodium (Na) going downstream. Sodium can deactivate catalysts used in fluid catalytic cracking units and other units, and can cause high rates of foiling in furnaces and put finished products (like high grade coke) off-specification. To reduce the amount of sodium going downstream, the controller 34 can advantageously control the total chlorine of the crude oil.

In some embodiments, the controller 34 adjusts on a substantially continuous basis at least one of the pressure drop and the dosage of the emulsion breaker 58 in response to at least one of the measured properties, total chlorine, and water percentage. In other embodiments, however, the pressure drop and the dosage of the emulsion breaker 58 are adjusted intermittently or in relation to a schedule as determined for the particular system 10. In some embodiments, the controller 34 is capable of generating an alert/alarm when at least one of the measured properties, total chlorine, and water percentage changes by more than a predetermined amount. In further embodiments, the controller 34 is capable of generating an alert/alarm when the measured properties, total chlorine, and water percentage changes by more than a predetermined amount in a predetermined amount of time. In response to the measured properties, total chlorine, and water percentage changes, the controller 34 can provide an early warning that the system 10 is changing so as to preempt potentially deleterious effects of the change.

The wash water 42 and emulsion breaker 58 may be introduced to the system 10 using any suitable type of chemical feed pump. Most commonly, positive displacement injection pumps are used powered either electrically or pneumatically. Continuous flow injection pumps are sometimes used to ensure specialty chemicals are adequately and accurately injected into a rapidly moving process stream. Though any suitable pump or delivery system may be used, exemplary pumps and pumping methods include those disclosed in U.S. Pat. No. 5,066,199 titled "Method for Injection Treatment Chemicals Using a Constant Flow Positive Displacement Pumping Apparatus" and U.S. Pat. No. 5,195,879, titled "Improved Method for Injecting Treatment Chemicals Using a Constant Flow Positive Displacement Pumping Apparatus," each incorporated herein by reference in its entirety.

The chemical injection pumps can be in fluid communication with one or more storage devices. In one aspect, there could be a conduit running from the chemical injection pump into the storage device. If necessary, the chemical injection pump could then supply a chemical through the conduit and into the storage device. There can also be multiple chemical injection pumps and each pump can have a conduit running therefrom to the storage device, or each storage device, if there is more than one storage device. Each different chemical injection pump can have a different chemical housed therein, so that based upon the measurements of the sample, one or more different chemicals could be added to the system 10 to modify its properties. In other aspects, the chemical injection pumps do not need to comprise conduits for routing the chemical into the storage device but instead may be located sufficiently close to the storage device so that they can simply release chemicals into the storage device in a manner similar to a faucet over a sink. Moreover, a chemical injection pump can comprise a conduit that leads directly into a pipeline in the system 10. In all aspects, the presently disclosed chemical injection pumps can be in communication with the controller 34, as will be described hereinafter in greater detail.

In some embodiments, the controller 34 is operable to transmit signals directed to a data control system (not shown), and the signals are associated with at least one of the measured properties, total chlorine, and water percentage. Data transmission of measured parameters or signals to chemical pumps, alarms, remote monitoring devices such as computers or cellular telephones, or other system components is accomplished using any suitable device, and across any number of wired and/or wireless networks, including as examples, WiFi, WiMAX, Ethernet, cable, digital subscriber line, Bluetooth, cellular technologies (e.g., 2G, 3G, Universal mobile Telecommunications Systems (UMTS), GSM, Long Term Evolution (LTE), or more), etc. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used. As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

For example, when the system 10 comprises one or more chemical injection pumps, these chemical injection pumps can be in communication with the controller 34 in any number of ways, including, as examples, through any combination of wired connection, a wireless connection, electronically, cellularly, through infrared, satellite, or according to any other types of communication networks, topologies, protocols, standards and more. Accordingly, the controller 34 can send signals to the pumps to control their chemical feed rates.

In an aspect, the system 10 is implemented to have a plurality of sensors (e.g., including, but not limited to, the emulsion level indicator 22, chlorine analyzer 26, and water analyzer 30) provide continuous or intermittent feedback, feedforward, or predictive information to the controller 34, which can relay this information to a relay device, such as the Nalco Global Gateway, which can transmit the information via cellular communications to a remote device, such as a cellular telephone, computer, or any other device that can receive cellular communications. This remote device can interpret the information and automatically send a signal (e.g. electronic instructions) back, through the relay device, to the controller 34 to cause the controller 34 to make certain adjustments to the output of the pumps. The information can also be processed internally by the controller 34 and the controller 34 can automatically send signals to the pumps, to adjust the amount of chemical injection. Based upon the information received by the controller 34 from the plurality of sensors or from the remote device, the controller 34 can transmit signals to the various pumps to make automatic, real-time adjustments, to the amount of chemical that the pumps are injecting into the system 10.

In the illustrated embodiment, the system 10 further includes a brine effluent analyzer 70 capable of measuring an oil percentage of the water phase. In some embodiments, the brine effluent analyzer 70 is capable of measuring the oil percentage of about 2.00% or less. In some embodiments, the brine effluent analyzer 70 is capable of measuring the oil percentage of about 0.005% to about 0.100%. In some embodiments, the brine effluent analyzer 70 is capable of measuring an oil percentage of about 0.005% or more, about 0.006% or more, about 0.007% or more, about 0.008% or more, about 0.009% or more, about 0.010% or more, about 0.020% or more, about 0.030% or more, about 0.040% or more, about 0.050% or more, about 0.060% or more, about 0.070% or more, about 0.080% or more, or about 0.090% or more. In further embodiments, the brine effluent analyzer 70 is capable of measuring an oil percentage of about 2.00% or less, 1.00% or less, 0.900% or less, 0.800% or less, 0.700% or less, 0.600% or less, 0.500% or less, 0.400% or less, 0.300% or less, 0.200% or less, 0.100% or less, 0.090% or less, about 0.080% or less, about 0.070% or less, about 0.060% or less, about 0.050% or less, about 0.040% or less, about 0.030% or less, about 0.020% or less, about 0.010% or less, about 0.009% or less, about 0.008% or less, about 0.007% or less, or about 0.006% or less. The controller 34 may be operatively coupled to the brine effluent analyzer 70, and adjust substantially in real time a dosage of an adjunct additive in response to the measured oil percentage so as to maintain the oil content in the effluent within a predetermined range.

Figure 2:
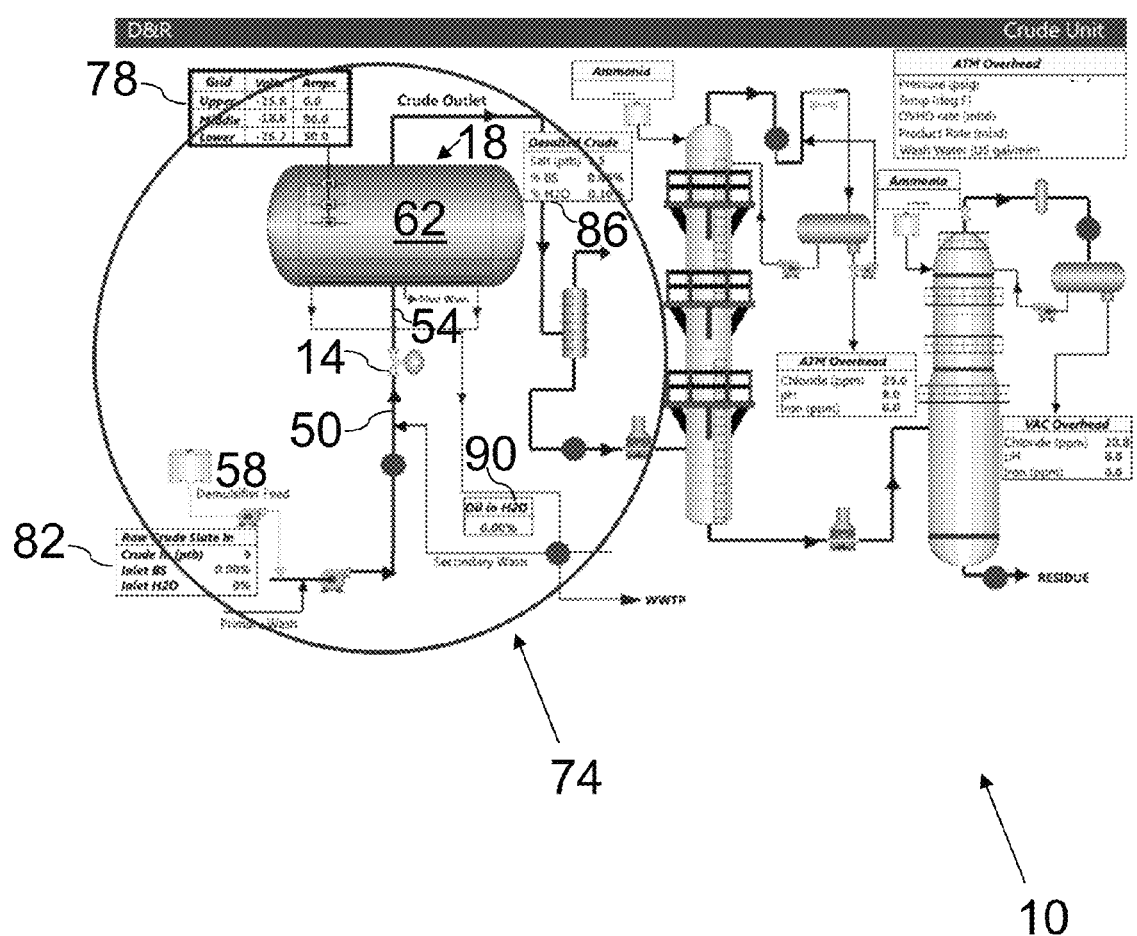
FIG. 2 is a schematic illustration of a display of the controller of FIG. 1.

Referring also to FIG. 2, the controller 34 can accommodate a diagnostics display or dashboard 74. For example, the diagnostics display 74 can include one or more of the following: a table 78 listing the volts and amps used to apply the electric field in the desalter vessel 18, a listing 82 of the salt, chlorine and/or sulfur, and water in the raw crude oil; a listing 86 of the salt, chlorine and/or sulfur, and water in the desalted crude; and an oil percentage 90 of the water phase. Other arrangements of the diagnostics display 74 may also be used.

3. METHOD OF MONITORING AND CONTROLLING DESALTING IN A CRUDE DISTILLATION UNIT

In operation, crude oil 38 and wash water 42 are mixed by a pressure drop across the mix valve 14, thereby forming the crude oil/water phase stream 46. The crude oil/water phase stream 46 is supplied into the desalter vessel 18, whereupon an emulsion forms at an interface between the crude oil and the water phase. The crude oil/water phase stream 46 is contacted with a dosage of the emulsion breaker 58 in an applied electric field. At least one property associated with the emulsion (e.g., a width of the interface and a rate of change) is measured using the emulsion level indicator 22. A total chlorine and a water percentage of the crude oil is measured. At least one of the pressure drop and the dosage of the emulsion breaker is adjusted substantially in real time in response to at least one of the measured properties, total chlorine, and water percentage. For example, if the controller 34 sees a sustained climb of total chlorine or a level of total chlorine of about 3 ppm or more, the controller 34 may be recommending changes to the mix valve 14 settings so as to maintain the total chlorine to about 3 ppm or less. It should be appreciated that a suitable or optimal chloride ion concentration range should be determined for each individual system. The optimum range for one system may vary considerably from that for another system. It is within the concept of the invention to cover any possible optimum chloride ion concentration range.

In some embodiments, a dosage of a caustic is injected substantially in real time in response to at least one of the measured properties, total chlorine, and water percentage. As a caustic agent, a dilute solution of sodium hydroxide is typically prepared in a 5 to 10% concentration (7.5 to 14° Baume) for ease of handling and to enhance distribution once injected into the crude oil 38 or wash water 42, for example. Concentration may be adjusted according to ambient conditions, such as for freeze point in cold climates. In some embodiments, changes in the caustic pump are limited in frequency. In some aspects, adjustment limits are set at a maximum of 1 per 30 min and sequential adjustments in the same direction may not exceed 8. For example, in some embodiments, after 8 total adjustments or a change of 50% or 100%, the pump could be suspended for an amount of time (e.g., 2 or 4 hours) and alarm could be triggered. If such a situation is encountered, it is advantageous to trigger an alarm to alert an operator. Other limits, such as maximum pump output or maximum sodium contribution to the system may also be implemented. It should be appreciated that it is within the scope of the invention to cause any number of adjustments in any direction without limitation. Such limits are applied as determined by the operator or as preset into the controller 34. The disclosed systems and methods for automated real-time monitoring and controlling of desalting may be used in a variety of systems, including in a crude oil unit and in all desalting and/or dehydration technologies, used in upstream and downstream oil and gas process, with and without electrostatic fields.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A system for monitoring or controlling desalting in a crude oil unit, comprising:
   a mix valve for mixing crude oil and wash water by a pressure drop across the mix valve, thereby forming a crude oil/water phase stream;
   a desalter vessel for receiving the crude oil/water phase stream, whereupon an emulsion forms at an interface between the crude oil and the water phase, the desalter vessel configured to contact the crude oil with a dosage of an emulsion breaker in an applied electric field;
   an emulsion level indicator coupled to an outer surface of the desalter vessel, the emulsion level indicator capable of measuring at least one property associated with the emulsion;
   a chlorine analyzer capable of measuring a total chlorine of the crude oil;
   a water analyzer capable of measuring a water percentage of the crude oil; and
   a controller operatively coupled to the mix valve, emulsion level indicator, and either the chlorine analyzer, the water analyzer, or the chlorine analyzer and the water analyzer, wherein the controller adjusts substantially in real time at least one of the pressure drop and the dosage of the emulsion breaker in response to at least one of the measured properties, total chlorine, and water percentage.

2. The system of claim 1, wherein the properties associated with the emulsion include a width of the interface and a rate of change of the width of the interface.

3. The system of claim 1, wherein the water analyzer is capable of measuring the water percentage of about 1.00% or less.

4. The system of claim 1 further comprising a brine effluent analyzer capable of measuring an oil percentage of the water phase, wherein the controller is operatively coupled to the brine effluent analyzer, the desalter being configured to contact the water phase with an adjunct additive, and the controller adjusts substantially in real time a dosage of the adjunct additive in response to the measured oil percentage.

5. The system of claim 3, wherein the brine effluent analyzer is capable of measuring the oil percentage of about 2.00% or less.

6. The system of claim 1, wherein the controller adjusts on a substantially continuous basis at least one of the pressure drop and the dosage of the emulsion breaker in response to at least one of the measured properties, total chlorine, and water percentage.

7. The system of claim 1, wherein the controller is operable to transmit signals to a data control system, and the signals are associated with at least one of the measured properties, total chlorine, and water percentage.

8. The system of claim 1, wherein the controller is capable of generating an alarm when at least one of the measured properties, total chlorine, and water percentage changes by more than a predetermined amount.

9. The system of claim 1, wherein the emulsion level indicator is positioned adjacent to the interface between the crude oil and the water phase.

10. The system of claim 1, wherein the emulsion level indicator is positioned at a first range of elevations.

11. A method of monitoring and controlling desalting in a crude oil unit using the system of claim 1, comprising:
    mixing crude oil and wash water by a pressure drop across the mix valve, thereby forming the crude oil/water phase stream;
    introducing the crude oil/water phase stream into the desalter vessel, whereupon an emulsion forms at the interface between the crude oil and the water phase;
    contacting the crude oil/water phase stream with the dosage of an emulsion breaker in an applied electric field;
    measuring at least one property associated with the emulsion using the emulsion level indicator;
    measuring the total chlorine and the water percentage of the crude oil; and
    adjusting substantially in real time at least one of the pressure drop and the dosage of the emulsion breaker in response to at least one of the measured properties, total chlorine, and water percentage.

12. The method of claim 11, wherein the properties associated with the emulsion include a width of the interface and a rate of change of the width of the interface.

13. The method of claim 11, wherein the water percentage is measured to a concentration of about 1.00% or less.

14. The method of claim 11 further comprising measuring an oil percentage of the water phase, contacting the water phase with an adjunct additive, and adjusting substantially in real time a dosage of the adjunct additive in response to the measured oil percentage.

15. The method of claim 11 further comprising injecting substantially in real time a dosage of a caustic in response to at least one of the measured properties, total chlorine, and water percentage.

16. The method of claim 11, wherein at least one of the pressure drop and the dosage of the emulsion breaker is adjusted on a substantially continuous basis in response to at least one of the measured properties, total chlorine, and water percentage.

17. The method of claim 11 further comprising transmitting signals to a data control system, wherein the signals are associated with at least one of the measured properties, total chlorine, and water percentage.

18. The method of claim 11 further comprising generating an alarm when at least one of the measured properties, total chlorine, and water percentage changes by more than a predetermined amount.

19. The method of claim 11, wherein the emulsion level indicator is positioned adjacent to the interface between the crude oil and the water phase.

20. The method of claim 11, wherein the emulsion level indicator is positioned at a first range of elevations.

21. The method of claim 11 wherein the emulsion level indicator measures the hydrogen content in the hydrocarbon, emulsion, and water phases inside the desalter vessel based on neutron backscatter principles.

22. The method of claim 11 wherein the total chlorine of the crude oil is measured based on bombarding or irradiating the crude oil with neutrons.

23. The system of claim 1 wherein the emulsion level indicator measures the hydrogen content in the hydrocarbon, emulsion, and water phases inside the desalter vessel based on neutron backscatter principles.

24. The system of claim 1 wherein the chlorine analyzer measures the total chlorine of the crude oil based on bombarding or irradiating the crude oil with neutrons.

* * * * *